2,921,950
METHOD FOR PREPARING COPOLYMERIC ORGANOPOLYSILOXANES

Victor B. Jex, Kenmore, and Donald L. Bailey, Snyder, N.Y., assignors to Union Carbide Corporation, a corporation of New York No Drawing. Application August 15, 1957
Serial No. 678,444

3 Claims. (Cl. 260—448.2)

This invention relates to the preparation of organopolysiloxanes. More particularly, this invention is concerned with the preparation of copolymeric organopolysiloxanes containing one or more aminopropylsiloxane units and one or more hydrocarbon siloxane units.

The copolymeric polysiloxanes prepared according to the process of this invention can be graphically depicted as composed of units having the formula:

$$[H_2NCH_2CH_2CH_2SiO_{1.5}]$$

and the formula:

$$\left[R'''_n SiO_{\frac{4-n}{2}}\right]$$

where $R'''$ is selected from the group consisting of alkyl and aryl groups and $n$ has an average value of from 1 to 3 inclusive.

The copolymeric polysiloxanes prepared according to the present invention have been found particularly useful as sizes for fibrous glass materials employed in combination with thermosetting resins such as the phenolic resins, the epoxy resins and the melamine resins. In addition, such copolymers depending upon the functionality of the alkyl and/or arylsiloxanes present therein, are also useful in the production of oils, and resins suitable for use as lubricants and molding compositions.

The copolymeric polysiloxanes of the present invention can be prepared by various methods. For example, they can be prepared by the cohydrolysis and cocondensation of an aminopropylalkoxysilane and an alkyl- or aryl- or alkyl and arylalkoxysilane. Such copolymers can also be prepared by the coequilibration of aminopropylalkoxysilanes or aminopropylpolysiloxanes with alkyl- or aryl- or mixed alkyl and arylpolysiloxanes.

The following examples are illustrative of the present invention:

Example I

To a round bottomed flask was added 0.18 mole (15.3 grams) of the cyclic tetramer of dimethylsiloxane, 0.03 mole (6.63 grams) of aminopropyltriethoxysilane and 0.1 gram of potassium silanolate. The flask was sealed and the contents therein heated to a temperature of 150° C. for a period of four hours. The product was recovered and identified as a copolymer containing the units:

$$[H_2NCH_2CH_2CH_2SiO_{1.5}] \quad [Me_2SiO]$$

The product was a white solid.

The product is comprised of polymers having the structure:

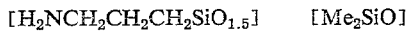

as well as polymers whose structures comprise having two or more aminopropylsiloxane units to the polymer molecule.

Example II

To a round bottomed flask was added 0.25 mole (17.75 grams) of the cyclic tetramer of dimethylsiloxane, 0.01 mole (2.21 grams) of aminopropyltriethoxysilane and 0.1 gram of potassium silanolate. The flask was sealed and the contents heated to a temperature of 150° C. for a period of four hours. The product was recovered and identified as a copolymer containing the units:

$$[H_2NCH_2CH_2CH_2SiO_{1.5}] \quad [Me_2SiO]$$

and having an average molecular weight of 1997.

The structure of the copolymer is similar to that disclosed in Example I and can be branched chained containing only one aminopropylsiloxane unit to the molecule or it can comprise a cross-linked network containing two or more aminopropylsiloxane units to the polymer molecule. The copolymer product apparently comprises mixtures of such structures.

Example III

To a round bottomed flask was added 0.211 mole (17.75 grams) of the cyclic tetramer of dimethylsiloxane, 0.005 mole (1.105 grams) of aminopropyltriethoxysilane and 0.1 gram of potassium silanolate. The flask was sealed and the contents heated to a temperature of 150° C. for a period of four hours. The product was recovered and identified as a copolymer containing the units:

$$[H_2NCH_2CH_2CH_2SiO_{1.5}] \quad [Me_2SiO]$$

having an average molecular weight of 3773 and a viscosity of 60.5 centistokes at 25° C.

The structure of the copolymer can be branched chained as depicted in Example I or it can comprise a cross-linked network containing two or more aminopropylsiloxane units to the polymer molecule. The copolymer product apparently comprises mixtures of such structures.

Example IV

To a round bottomed flask was added a toluene solution containing 120 grams of a copolymer containing trifunctional methylsiloxane units, trifunctional phenylsiloxane units, and difunctional dimethylsiloxane units, 53 grams of gamma-aminopropyltriethoxysilane and 3.5 grams of potassium hydroxide. The mixture was heated to a temperature of about 100 to 110° C. for a period of 20 hours. After heating, the solvent was distilled and water added to the product. The mixture was again heated at its boiling point for three hours and acetic acid added thereto to neutralize the potassium hydroxide catalyst present therein. The product obtained the following units:

$$[H_2NCH_2CH_2CH_2SiO_{1.5}] \quad [Me_2SiO]$$
$$[MeSiO_{1.5}] \quad [PhSiO_{1.5}]$$

This application is a continuation-in-part of our copending application Serial No. 483,421, filed January 21, 1955, which issued as U.S. Patent No. 2,832,754 on April 29, 1958.

What is claimed is:

1. A process for preparing copolymeric siloxanes composed of units having the formula:

$$[H_2NCH_2CH_2CH_2SiO_{1.5}]$$

and the formula:

$$\left[R'''_n SiO_{\frac{4-n}{2}}\right]$$

where $R'''$ is selected from the group consisting of alkyl and aryl groups and $n$ has an average value of from 1 to 3 inclusive, which comprises forming a mixture of a gamma-amino-propyltrialkoxysilane, and a polysiloxane of the formula:

$$\left[ R'''_n SiO_{\frac{4-n}{2}} \right]$$

where $R'''$ is selected from the group consisting of alkyl and aryl groups and $n$ has an average value of from 1 to 3 inclusive, and an alkaline catalyst selected from the group consisting of potassium hydroxide and potassium silanolate and heating the mixture to a temperature sufficiently elevated to cause said gamma-amino-propyl-alkoxysilane and said polysiloxane to react to form the copolymeric product.

2. A process for preparing copolymeric siloxanes composed of units having the formula:

$$[H_2NCH_2CH_2CH_2SiO_{1.5}]$$

and the formula:

$$\left[ R'''_n SiO_{\frac{4-n}{2}} \right]$$

where $R'''$ is selected from the group consisting of alkyl and aryl groups and $n$ has an average value of from 1 to 3 inclusive, which comprises forming a mixture of a gamma-aminopropyltriethoxysilane, a polysiloxane of the formula:

$$\left[ R'''_n SiO_{\frac{4-n}{2}} \right]$$

where $R'''$ is selected from the group consisting of alkyl and aryl groups and $n$ has an average value of from 1 to 3 inclusive, and potassium silanolate and heating the mixture to a temperature sufficiently elevated to cause said gamma-aminopropyltriethoxysilane and said polysiloxane to react to form the copolymeric product.

3. Process according to claim 1 wherein the gamma aminopropyltrialkoxysilane and the polysiloxane are reacted together at a temperature between 100° C. and 150° C.

References Cited in the file of this patent

UNITED STATES PATENTS

| | | |
|---|---|---|
| 2,738,357 | Speier | Mar. 13, 1956 |
| 2,754,311 | Elliott | July 10, 1956 |
| 2,762,823 | Speier | Sept. 11, 1956 |
| 2,815,300 | Smith | Dec. 3, 1957 |
| 2,832,754 | Jex et al. | Apr. 29, 1958 |

FOREIGN PATENTS

| | | |
|---|---|---|
| 533,700 | Belgium | Nov. 26, 1954 |
| 1,117,543 | France | Feb. 27, 1956 |
| 223,894 | Japan | July 16, 1956 |
| 769,498 | Great Britain | Mar. 6, 1957 |